Nov. 27, 1945.  S. M. RANSOME  2,389,815
MACHINE FOR HOBBING
Filed July 16, 1942
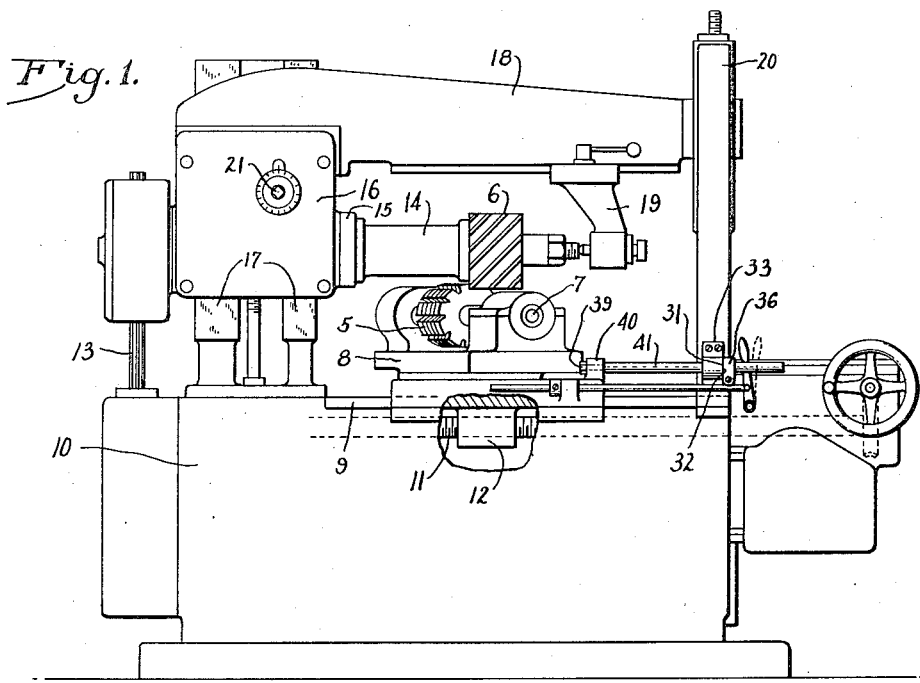
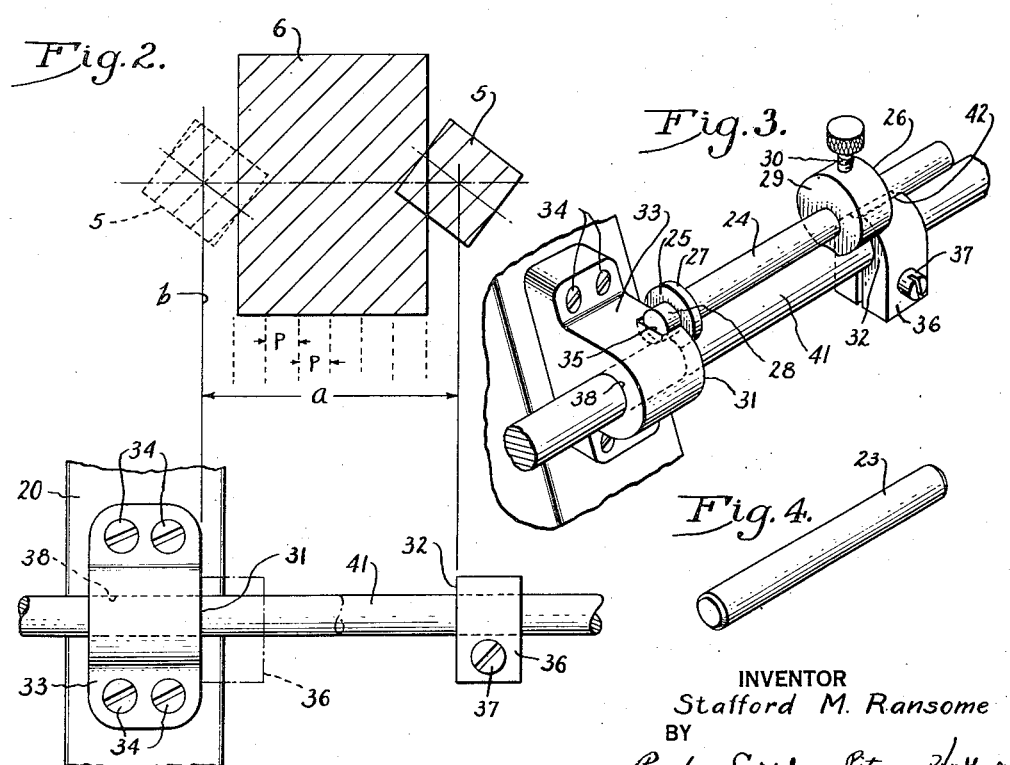
INVENTOR
Stafford M. Ransome
BY
ATTORNEYS Patented Nov. 27, 1945

2,389,815

UNITED STATES PATENT OFFICE 2,389,815

MACHINE FOR HOBBING

Stafford M. Ransome, Rockford, Ill., assignor to Barber-Colman Company, Rockford, Ill., a corporation of Illinois Application July 16, 1942, Serial No. 451,104

3 Claims. (Cl. 90—4)

This invention relates to the art of hobbing helical gears and the general object is to provide a new and simplified method and apparatus for conditioning a hobbing machine for the taking of a second or finishing cut following a preliminary or roughing cut.

Another object is to provide such an apparatus as a simple accessory for a hobbing machine.

Other objects and advantages of the invention will become apparent from the following detailed description taken in connection with the accompanying drawing, in which Figure 1 is an elevational view of a hobbing machine for use in practicing the present invention.

Fig. 2 is a fragmentary view of a part of the machine combined with a schematic view of a hob and gear at different points in the cutting of the gear.

Fig. 3 is a fragmentary perspective view of a portion of the hobbing machine and the gauge used in accordance with the present invention.

Fig. 4 is a perspective view of a modified form of pin.

While the invention is susceptible of various modifications and alternative constructions and may be practiced in various ways, I have illustrated in the drawing and will herein describe the preferred embodiment and manner of carrying out the invention. It is to be understood that I do not thereby intend to limit the invention by such disclosure but aim to cover all modifications, alternative constructions, and methods falling within the spirit and scope of the invention as expressed in the appended claims.

Figure 1 of the drawing shows a standard Barber-Colman type A hobbing machine for supporting a hob 5 and a helical gear blank 6 and for effecting synchronized rotation of and relative feed motion between the two to cut the teeth of the gear. The hob is on a spindle 7 mounted on a slide 8 which is movable along a guideway 9 on a bed 10 by rotation of a screw 11 threading into a nut 12 on the slide. By engaging suitable clutches, the screw 11 may be power rotated to move the hob slide in one direction at a feed speed during cutting of the gear and in the other direction to retract the slide preferably at a rapid traverse rate.

Through a spline connection (not shown) the hob is rotated in synchronism with the feed screw, the same drive extending through a spline shaft 13 to the spindle 15 connected to the arbor 14 on which the gear blank is mounted. One end of this spindle is journaled in a head 16 which is guided by vertical ways 17 and carries an over arm 18 carrying a bracket 19 for detachably supporting the other end of the work spindle. A brace 20 supports the outer end of the arm from the bed. By turning a shaft 21, a screw mechanism is actuated to effect vertical adjustment of the head 16 to determine the depth of the cut or to move the blank out of engagement with the hob while the latter is being retracted preparatory to a second cut.

With the machine above described, a helical gear is hobbed by mounting a blank on the arbor 14 with the hob slide retracted to the right of the blank, the head 16 being adjusted vertically to set the blank for the proper depth of cut. Rough hobbing of the blank is then effected by engaging the feed to advance the hob across the blank, the hob and blank being simultaneously rotated in synchronism with the feed motion.

The present invention has to do with the resetting of the hob for the taking of a second or finishing cut and insuring that the hob teeth will track properly in the rough cut grooves. The improved method includes the steps of raising the head 16 after the roughing cut to permit free retraction of the hob, reversing the feed of the hob slide to move the latter back to starting position and through a distance $a$ accurately measured from the position $b$ in which the hob feed and work spindle rotation are interrupted and constituting an exact multiple of the linear or axial pitch $P$ of the gear, lowering the head 16 to position the rough gear for a finishing cut, and reengaging the synchronized feed to advance the hob across the blank a second time.

With the hobbing machine above described, the method may be carried out quickly and conveniently using a gauge of simple and inexpensive construction. While the gauge may comprise a plain rod 23 (see Fig. 4) accurately dimensioned in length, it is preferred to employ a gauge which is adjustable for a wide variety of gears. As shown in Fig. 3, the preferred gauge comprises a rod 24 having a rigid and fixed abutment 25 at one end and carrying at its other end an abutment 26 which may be clamped to the rod but which is adjustable therealong so that the spacing of the two abutments may be varied as desired to equal exactly the proper multiple of the pitch of the gears being hobbed. Herein, the abutment 25 is on a collar 27 fast on the rod 24 a short distance from one end so as to leave the rod end 28 projecting. The abutment 26 is on a collar 29 slidable along the rod and adapted to be secured to the rod in adjusted position by means of a thumb screw 30.

The gauge abutments coact with stop surfaces 31 and 32 mounted on the hobbing machine and spaced apart along the line of feed of the hob slide 8, one stop being fixed to the machine and the other being movable with the hob slide. In the present instance, the fixed stop constitutes one side surface of a bracket 33 secured as by screws 34 to the front of the brace 20 at the base thereof. Preferably, a recess 35 is formed in the upper portion of this bracket to receive the end 28 and thereby hold the gauge in operative position.

The stop 32 is formed by one side surface of dog 36 of U-shape adjustably clamped by a screw 37 to a rod 41 which slides through a hole 38 in the bracket 33 and is fastened by a screw 39 to a lug 40 on the hob slide. A notch 42 along the upper edge of the dog 36 receives one end of the rod 24 so that the gauge will be supported on the machine as shown in Fig. 3 without being held by the operator and while the abutments 25 and 26 are disposed against the stops 31 and 32 respectively.

To use the gauge, the collar 29 is first adjusted along the rod 24 so that the abutments are spaced apart a distance $a$ greater than the feed motion required to move the hob past the gear blanks, this distance being an exact multiple, 8 in this instance, of the linear pitch P of the gear 6. The measurement of the abutment spacing may be effected in any well known way by which an accuracy on the order of a few thousandths of an inch may be obtained. After the hob has passed out of engagement with the blank 6 following the initial or roughing cut, the feed motion and work spindle rotation are interrupted and the dog 36, after loosening of the screw 37, is shifted to the left along the rod 41 until it comes against the stop surface 31 as shown in dotted outline in Fig. 2. In this position, the movable stop surface 32 coincides with the fixed surface 31 while the hob is in its interrupted position and therefore with its teeth in cutting registry with the interdental spaces of the rough cut gear. After elevation of the head 16 to raise the gear above the hob, the rapid return feed is engaged and the hob slide is retracted. This motion is continued until the stops 31 and 32 have been separated sufficiently to permit the abutments 25 and 26 of the gauge to just fit in between the stops. In this condition, the dog and the hob will be disposed in the full line positions shown in Fig. 2 and the hob will be spaced from the stopped or dotted position a distance exactly 8 times the gear pitch so that the hob teeth will register accurately with the gear grooves. Next, the head 16 is lowered and the gear disposed in a position slightly lower than the position in which it was disposed during the rough cut. Finally, the finish cut is effected by reengaging the feed to advance the hob past the gear while the latter and the hob are rotated as before in synchronism with the feed motion.

I claim as my invention:

1. In combination with a machine for hobbing helical gears having hob and gear blank supports rotatable in synchronism and mechanism for relatively feeding the supports along a rectilinear path in synchronism with the rotation of said hob and blank, a stationary stop, a member adjacent said stop mounted on the machine for movement during feeding of said movable support, a second stop mounted on said member for adjustment toward and away from said first stop, and a gauge having oppositely facing abutments engageable with the opposed surfaces of said stops when the latter are separated and accurately spaced apart a multiple of the linear pitch of the helical gear cut by said hob, said gauge being operable when placed between said stops to determine a measured retraction of said movable support.

2. In combination with a machine for hobbing helical gears having hob and gear blank supports rotatable in synchronism and mechanism for relatively feeding the supports along a rectilinear path in synchronism with the rotation of said hob and blank, two stops adapted to be brought into contact with each other at the end of a feed motion during which said gear blank is rough cut by said hob, one of said stops being stationary and the other being movable in unison with said feed motion so as to be retracted from the stationary stop during retraction of said movable support preparatory to taking a finishing cut by said hob, and a member insertable between said stops after separation of same, said member having spaced abutments respectively engageable with said stops to gauge the extent of retraction of said removable support.

3. In combination with a machine for hobbing helical gears having hob and gear blank supports rotatable in synchronism and mechanism for relatively feeding the supports along a rectilinear path in synchronism with the rotation of said hob and blank, a rod movable with said movable support, a stop fixed on said machine adjacent said rod, a dog carried by said rod and adjustable selectively therealong, said dog providing a stop coacting with said first stop, and a gauge adapted to be received between said stops when said movable support has been retracted from a stopped position a distance equal to a multiple of the linear pitch of the helical gear cut by said hob.

STAFFORD M. RANSOME.